Feb. 2, 1965  K. ELLEGAST ETAL  3,168,605
PROCESS FOR THE PRODUCTION OF WEBS OF ELASTIC SYNTHETIC RESINS
Filed Oct. 3, 1963

INVENTORS:
KONRAD ELLEGAST, ULRICH KNIPP
BY Clelle W. Upchurch
ATTORNEY

United States Patent Office 3,168,605
Patented Feb. 2, 1965

3,168,605
PROCESS FOR THE PRODUCTION OF WEBS OF ELASTIC SYNTHETIC RESINS
Konrad Ellegast, Leichlingen, and Ulrich Knipp, Leverkusen, Germany, assignors to Farbenfabriken Bayer Aktiengesellschaft, Leverkusen, Germany, a corporation of Germany
Filed Oct. 3, 1963, Ser. No. 313,507
4 Claims. (Cl. 264—166)

This invention relates to an apparatus and process for the production of webs of elastic synthetic resins and more particularly, to an apparatus and method for preparing continuous elastic synthetic webs or sheets by a casting procedure. This application is a continuation-in-part of U.S. application Serial Number 115,241 filed June 6, 1961.

It has been heretofore known to prepare sheets by extrusion or calendering and also to prepare webs containing reinforcing fibers by the application of the synthetic materials to the fibers by processes such as, for example, spraying, dipping, spreading by means of doctor blades and the like. These various methods, however, generally require complicated equipment, which increases the initial cost of manufacture. It has also been known to provide films by extruding a polymeric material into a web which is passed around a chilling roll under conditions which prevent the occlusion of air between the web and the roll. This process and apparatus is inapplicable to the preparation of webs directly from reaction melts as used in cast polyurethane elastomers, which cannot be extruded.

It is therefore an object of this invention to provide an improved method of making webs of elastic synthetic resins. It is another object of this invention to provide an apparatus for making webs of elastic synthetic resins. It is still another object of this invention to provide a method for making webs of elastic synthetic resins having a reinforcing fabric or filaments provided therein. It is a further object of this invention to provide a more economical method and apparatus for preparing webs of elastic synthetic resins. It is another object of this invention to provide a process and apparatus for manufacturing cast polyurethane webs.

These and other objects will become apparent from the following drawings in which—

Figure 1:
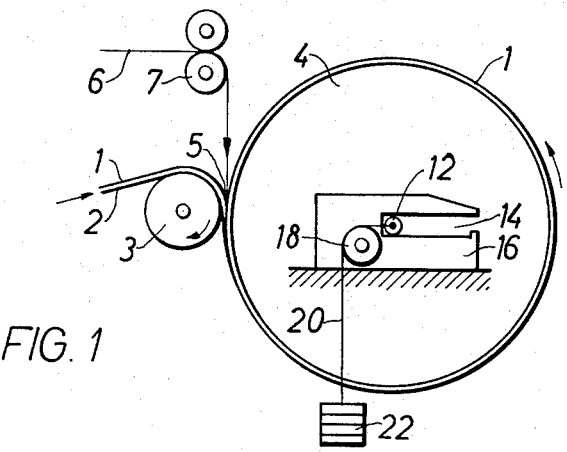
Figure 2:
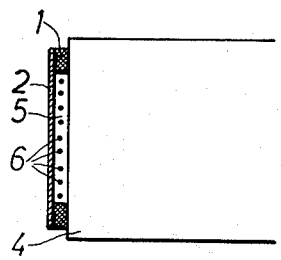
Figure 3:
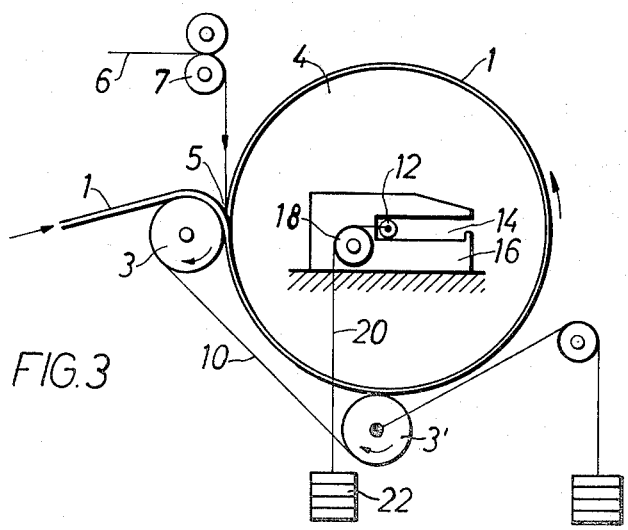

FIGURE 1 is a side elevation view of one embodiment of an apparatus in accordance with this invention, FIGURE 2 is a plan view partially in section of a portion of FIGURE 1 and FIGURE 3 is a side elevation view of another embodiment of an apparatus in accordance with this invention.

The foregoing objects and others are accomplished in accordance with this invention, generally speaking, by providing a process and apparatus whereby an elastic synthetic resin is molded into a continuous web which may or may not contain reinforcing fibers or fabrics. The method of the invention contemplates continuously casting a liquid synthetic resin into a trough provided between a conveyor belt, which passes over a roller disposed adjacent to a large metal winding cylinder upon which the conveyor belt is wrapped. More particularly, the process of the invention contemplates passing a conveyor belt over a roller in a manner such that a liquid resinous material can be cast into the space between the conveyor and the winding cylinder and permitted to quickly solidify therein to form a continuous band or sheet of synthetic elastic material. A means for heating the resinous material beneath the point of casting may be provided. If desired, fibers or fabrics may be passed through the space provided between the conveyor and the winding cylinder at the point where the resinous material is cast to thereby fabricate a sheet having a reinforcing fiber or fabric embedded therein. Thus, a web having a strengthened core of a fabric material and being of any length, width and thickness can be fabricated with very small expense from the standpoint of equipment and space by continuously casting into a laterally defined gap, formed between a travelling conveyor belt and the peripheral surface of a revolving winding cylinder, a liquid resinous material, causing the resinous material to solidify just beneath the casting surface of the gap and winding both the conveyor belt and the fabricated web onto the revolving winding cylinder. The layers of the web together with the belt, can be wound upon itself in superposition to achieve a web of any desired length. The gap or slot-like space between the conveyor and the cylinder can be adjusted with respect to width and thickness by suitable spacing or lateral slot-limiting means which determine the distance between the conveyor belt and the winding cylinder and the width of the web which is formed. When it is desired to remove the finished web, it is unwound, merely by rotating the winding cylinder in the opposite direction.

It is also possible, of course, to provide fabric or filament-like reinforcements embedded in the web, by passing into the slot provided by the conveyor belt and the winding cylinder a fabric or a plurality of filaments so that reinforced synthetic resin foils or webs suitable for example, for preparing conveyor belts are obtained. The reinforcing material may be moistened or coated with adhesive to provide better bonding to the synthetic resin composition which is cast around the filaments.

The invention further contemplates an apparatus for carrying out the above process which comprises a winding cylinder about which a suitable conveyor belt is wound. The conveyor belt passes over a roller immediately before engaging the winding cylinder to provide a trough-like depression where the conveyor belt and the winding cylinder come together. Between the winding cylinder and the belt is provided a means for determining the size of the resulting web formed. This means includes suitable spacing elements which are either provided on the conveyor belt, on the winding cylinder or are continually inserted in the proper position between the belt and the cylinder as the conveyor belt approaches the winding cylinder. Disposed immediately above the opening between the winding cylinder and the conveyor belt is a means for introducing into the casting gap where the elastic synthetic resin is to be poured, a continuous fabric or fiber material. This means can encompass a roller or a pair of pinch rolls through which the filaments are passed. The axis of the winding cylinder is disposed so the cylinder surface is held against the roller. As the belt is wound about the cylinder in several layers, the winding cylinder moves away from the roller to always maintain the casting gap in the same position.

In FIGURE 1, there is shown an apparatus for the continuous production of a web consisting of reinforced cords or fabrics and an outer portion of an elastic synthetic resin. Any suitable elastic synthetic resin may be used in the process of this invention such as, for example, natural or synthetic rubbers, cellulose acetate, polystyrene, polyvinyl chloride, polyvinyl acetate, methacrylates, phenolics and polyurethanes. It is preferred, however, that polyurethanes be used because of the superior products formed due to the nature of this elastomeric material. Further, this invention is particularly applicable to cast polyurethane formulations which cannot be fabricated by extrusion or other thermoplastic techniques because of the inherent rapid gel time. Suitable polyurethane casting compositions are those set forth in U.S. Patents Reissue 24,514; 2,620,516; 2,621,166; 2,729,618;

2,778,810 and 2,948,691. The metal strip or conveyor belt 2 is provided with elastic limiting bars 1 which are pressed by a guide or pressure roller 3 which has a fixed position against the periphery of the winding cylinder 4 rotating in the direction indicated by the arrows to form an enclosed space or gap into which a synthetic resinous material can be poured. The winding cylinder 4 can have a means on its periphery for holding the end of the belt 2 which is initially encountered. Any suitable means such as a clamp may be employed. It can be readily seen that the conveyor belt 2 will be taken up and wound about winding cylinder 4. Provided immediately above the opening 5 formed between conveyor belt 2, the winding cylinder 4 and the lateral limiting bars 1 is a means 7 for introducing a fabric or a plurality of filaments into the casting slot or gap 5. Any suitable means (not shown) for pouring the resinous material into the gap 5 is provided. The winding cylinder 4 is provided with an axle 12 which rotates in a guide slot 14 of a bearing block 16 upon which is mounted a small pulley 18. The axle 12 has attached thereto a wire or rope which passes over the pulley 18 and is attached to a suitable weight 22. As the number of turns of the belt 2 and the web on the winding cylinder 4 increases, the winding cylinder 4 will move to the right, thus causing the axle 12 to move toward the open end of the guide slot 14.

FIGURE 2 is a plan view clearly illustrating the manner in which the conveyor belt 2, the lateral limiting bars 1 and the winding cylinder 4 form the casting slot or gap 5 into which the resinous material is poured and the filaments 6 are introduced.

In operation, a liquid synthetic resin, such as those disclosed in the above-mentioned patents, is continuously fed into the casting slot 5. The synthetic resin solidifies immediately below the casting surface to form a shape defined by the conveyor belt 2, the limiting bars 1 and the winding cylinder 4. Simultaneously with the introduction of the casting, resin cord filaments or fabrics 6 are introduced into slot 5 over the roller 7 which has been previously adjusted relative to the position of the guide or pressure roller 3. These filaments become embedded in the synthetic resin thus reinforcing the completed web. The belt 2 together with the limiting bars 1 and the web thus formed is continually wound around the cylinder 4 and upon themselves depending upon the desired length of the web. When the casting operation is completed, the web is removed simply by rotating the winding cylinder 4 in the reverse direction.

It is also possible according to the invention to produce a web of any desired length, width and thickness by casting the liquid synthetic resin composition into a slot-like space 5 which is formed between winding cylinder 4, endless carrier belt 2 and the lateral limiting bars 1 in accordance with the apparatus shown in FIGURE 3. In utilizing this apparatus, the endless belt 10 which may be of metal is driven between two guide rollers 3 and 3'. This belt 10 runs on the limiting or spacing bars 1 which are wound helically in one or more layers around the winding cylinder 4 and which are made of an elastic, temperature resistant material. The liquid synthetic resin is continuously introduced into the slot 5 at an ejection speed such that the solidification of the helically wound synthetic web occurs at the guide roller 3. In order to prevent the adhesion of the synthetic resin web to the lateral limiting bars 1, the belts 2 and 10 or the cylinder 4, they may be coated with a mold releasing agent such as a silicone oil, or the bars may be made entirely of or coated with a synthetic resin having a non-adhesive character such as, for example, polytetrafluoroethylene.

After the web is wound around the winding cylinder 4 and the casting process is completed, the wound or coiled roll can be subjected to a subsequent heat treatment in an oven or the like to finally cure the synthetic resinous material. Subsequent to the heat treatment the cylinder 4 is rotated in the reverse direction and the finished product separated therefrom.

The curvature caused by winding the webs about the winding cylinder 4 can be avoided by using a winding cylinder having the largest possible diameter and by winding the web in a reverse direction before the completion of the heat treatment. Thus, it can be seen that webs having any desired dimension can be prepared in accordance with this invention by a simple casting technique which has not been heretofore contemplated. Previously, the production of webs such as those prepared by the process and apparatus of this invention required either extrusion type devices or large calendering rolls and other equipment for handling viscous materials. Now, by this process, any compound which can be simply cast into a mold can be used for the preparation of webs and sheets.

Although the invention has been described in considerable detail for the purpose of illustration, it is to be understood that variations may be made therein by those skilled in the art without departing from the spirit of the invention and the scope of the claims.

What is claimed is:
1. A process for the production of continuous webs of elastic synthetic resins which comprises passing a conveyor belt about a guide roller in close proximity to a winding cylinder to thereby form a laterally defined gap therebetween, pouring a liquid synthetic resinous composition into said gap, causing said liquid composition to solidify immediately below the point of introduction between said conveyor belt and winding cylinder and winding said conveyor belt including said solidified resinous composition about said winding cylinder.

2. The process of claim 1 wherein reinforcing filaments are introduced into the space between said guide roller and said winding cylinder during the casting of the synthetic resinous composition.

3. The process of claim 1 wherein said synthetic resinous composition is subjected to a heat treatment after winding.

4. The process of claim 2 wherein said synthetic resinous composition is subjected to a heat treatment after winding.

References Cited in the file of this patent
UNITED STATES PATENTS

| | | |
|---|---|---|
| 2,590,186 | Land | Mar. 19, 1952 |
| 2,790,464 | Stephens et al. | Apr. 30, 1957 |

FOREIGN PATENTS

| | | |
|---|---|---|
| 792,041 | Great Britain | Mar. 19, 1958 |